(12) United States Patent
Krishnamurthy

(10) Patent No.: US 10,963,683 B2
(45) Date of Patent: Mar. 30, 2021

(54) DETERMINING OCCUPANCY OF A MULTI-OCCUPANCY SPACE

(71) Applicant: WOKPLACE FABRIC LIMITED, Hemel Hempstead (GB)

(72) Inventor: Raj Krishnamurthy, Buckinghamshire (GB)

(73) Assignee: WORKPLACE FABRIC LIMITED, Hemel Hempstead (GB)

( * ) Notice: Subject to any disclaimer, the term of this patent is extended or adjusted under 35 U.S.C. 154(b) by 3 days.

(21) Appl. No.: 16/467,555

(22) PCT Filed: Nov. 29, 2017

(86) PCT No.: PCT/GB2017/053600
§ 371 (c)(1),
(2) Date: Jun. 7, 2019

(87) PCT Pub. No.: WO2018/104706
PCT Pub. Date: Jun. 14, 2018

(65) Prior Publication Data
US 2019/0303661 A1 Oct. 3, 2019

(30) Foreign Application Priority Data
Dec. 8, 2016 (GB) .................. 1620867.0

(51) Int. Cl.
*G08B 23/00* (2006.01)
*G06K 9/00* (2006.01)
(Continued)

(52) U.S. Cl.
CPC ........ *G06K 9/00369* (2013.01); *G01J 5/0025* (2013.01); *G06K 9/00771* (2013.01); *H05B 47/105* (2020.01); *H04N 7/188* (2013.01)

(58) Field of Classification Search
CPC ... G06T 5/00; G06T 7/60; G06K 9/20; H04N 7/188
See application file for complete search history.

(56) References Cited

U.S. PATENT DOCUMENTS

2013/0285805 A1* 10/2013 Pattok ............... G08B 25/04
340/506
2014/0125355 A1* 5/2014 Grant ................ G01R 27/2605
324/629
(Continued)

FOREIGN PATENT DOCUMENTS

FR 2967518 A1 5/2012

OTHER PUBLICATIONS

Mamun et al.; "Vision system of a hospital robot surveillance module"; IPROMS; 2009; 6 pages.
(Continued)

*Primary Examiner* — Phung Nguyen
(74) *Attorney, Agent, or Firm* — Baker Hostetler

(57) ABSTRACT

A system comprises a first detector for detecting whether a multi-occupancy space is occupied by at least one individual and a plurality of second detectors for detecting whether an individual is present in each of a respective plurality of spaces within the multi-occupancy space. A controller is configured to monitor whether an individual is present in the multi-occupancy space based on a signal derived from the first detector. If the presence of at least one individual is detected based on the signal derived from the first detector, the controller determines occupancy of the multi-occupancy space based on signals derived from the plurality of second detectors.

17 Claims, 3 Drawing Sheets

(51) Int. Cl.
*G01J 5/00* (2006.01)
*H05B 47/105* (2020.01)
*H04N 7/18* (2006.01)

(56) References Cited

U.S. PATENT DOCUMENTS

2015/0012307 A1* 1/2015 Moss ................. G06Q 10/02
    705/5
2017/0364817 A1* 12/2017 Raykov ................. G06Q 50/16

OTHER PUBLICATIONS

International Patent Application No. PCT/GB2017/053600; Int'l Written Opinion and Search Report; dated Mar. 8, 2018; 8 pages.

* cited by examiner

DETERMINING OCCUPANCY OF A MULTI-OCCUPANCY SPACE

CROSS-REFERENCE TO RELATED APPLICATIONS

This application is the National Stage of International Patent Application No. PCT/GB2017/053600, filed Nov. 29, 2017, which claims priority to Great Britain Patent Application No. 1620867.0, filed Dec. 8, 2016, the entire disclosures of which applications are incorporated herein by reference for any and all purposes.

FIELD

This specification relates to determining occupancy of multi-occupancy spaces, for example in work environments such as offices.

BACKGROUND

Detection and knowledge of occupancy levels in office spaces is the first step in improving overall utilisation of real estate assets. With real estate costs sky rocketing in cities like London, this activity has become of ongoing relevance. Further with the growth of knowledge workers in the economy, the importance of collaborative working has increased. This in turn has resulted in the creation of more contiguous spaces for group interaction such as meeting rooms of various sizes, collaboration spaces, conference facilities, social spaces etc. in the average office. With these two trends, it has become relevant to understand the dynamics of the usage of contiguous or semi-contiguous collaborative spaces.

SUMMARY

In a first aspect, this specification describes a system comprising a first detector for detecting whether a multi-occupancy space is occupied by an individual, and a plurality of second detectors for detecting whether an individual is present in each of a respective plurality of spaces within the multi-occupancy space. The system further comprises a controller configured to monitor whether an individual is present in the multi-occupancy space, based on a signal derived from the first detector. If the presence of an individual is detected based on the signal derived from the first detector, the controller determines occupancy of the multi-occupancy space based on signals derived from the plurality of second detectors.

The first detector may be an alerting sensor such as a passive infrared detector (PIR). Such a detector is advantageous because it is "always on", and provides a signal immediately when an individual is detected within the multi-occupancy space.

Each of the second detectors may be a scanning sensor such as a thermal sensor. Hence, each space in the multi-occupancy space may have its own dedicated scanning sensor. Alternatively, one or more of the second sensors may be a pressure sensor.

Scanning sensors have the advantage of being sensitive to small variations and facilitate reliable identification of the presence of individuals. On the other hand such sensors demand a relatively high power budget when operated on a continuous basis. However in various embodiments of the invention, the second detectors are only used to determine occupancy after the first detector is triggered. In this way, the benefits of different types of sensing are exploited, thereby providing a system which can detect individual presence only when needed, and without the need for a large power budget. If the multi-occupancy space is used only occasionally, then the power budget may be very low, and in some examples may be sufficiently low such that the second detectors and/or the first detector may be battery operated.

The first detector, the plurality of second detectors, and the controller may be connected by one or more wires, for example by a daisy chain connection sensor bus.

The first detector and the controller may be integrated in a single unit.

The controller may be configured to transmit data relating to the occupancy of the multi-occupancy space to a remote server. The data may be transmitted if predetermined conditions for communication are met. For example, occupancy information may only be transmitted to the remote server when it is determined that occupancy of the multi-occupancy space has changed.

In a second aspect, this specification describes a method, comprising monitoring whether at least one individual is present in a multi-occupancy space, based on a signal derived from a first detector. If the presence of one or more individuals is detected based on a signal derived from the first detector, the occupancy of the multi-occupancy space is determined based on signals derived from a plurality of second detectors, said second detectors being configured for detecting whether an individual is present in each of a respective plurality of spaces within the multi-occupancy space.

Each second detector may detect whether an individual is present in only one of said plurality of spaces.

Determining occupancy of the multi-occupancy space may comprise polling the plurality of second detectors. The plurality of second detectors may be periodically polled.

Monitoring based on signal(s) derived from a first detector may be stopped if the presence of one or more individuals is detected in the multi-occupancy space. Stopping said monitoring may comprise causing the first detector to power down.

The method may further comprise monitoring whether an individual is present in each of said plurality of respective spaces within the multi-occupancy space, based on signals derived from the second detectors. If the signals derived from the second detectors indicate that no individuals are present in said plurality of spaces, then the first detector may be caused to resume monitoring whether one or more individuals are present in the multi-occupancy space.

If the signals derived from the second detectors indicate that no individuals are present in said plurality of spaces, then monitoring based on signals derived from the second detectors may be stopped, for example by causing the second detectors to power down.

Determining occupancy of the multi-occupancy space based on signals derived from the second detectors may comprise counting the number of occupied spaces detected by the second detectors.

In a third aspect, this specification describes apparatus configured to perform the method described above with reference to the second aspect. The apparatus may comprise at least one processor and at least one memory, the memory comprising computer-readable instructions, which, when executed by the at least the at least one processor, cause the apparatus to perform the method described above with reference to the second aspect.

BRIEF DESCRIPTION OF THE DRAWINGS

In order that the invention may be more fully understood, embodiments thereof will now be described by way of example only, with reference to the accompanying figures, in which.

DETAILED DESCRIPTION

Figure 1:
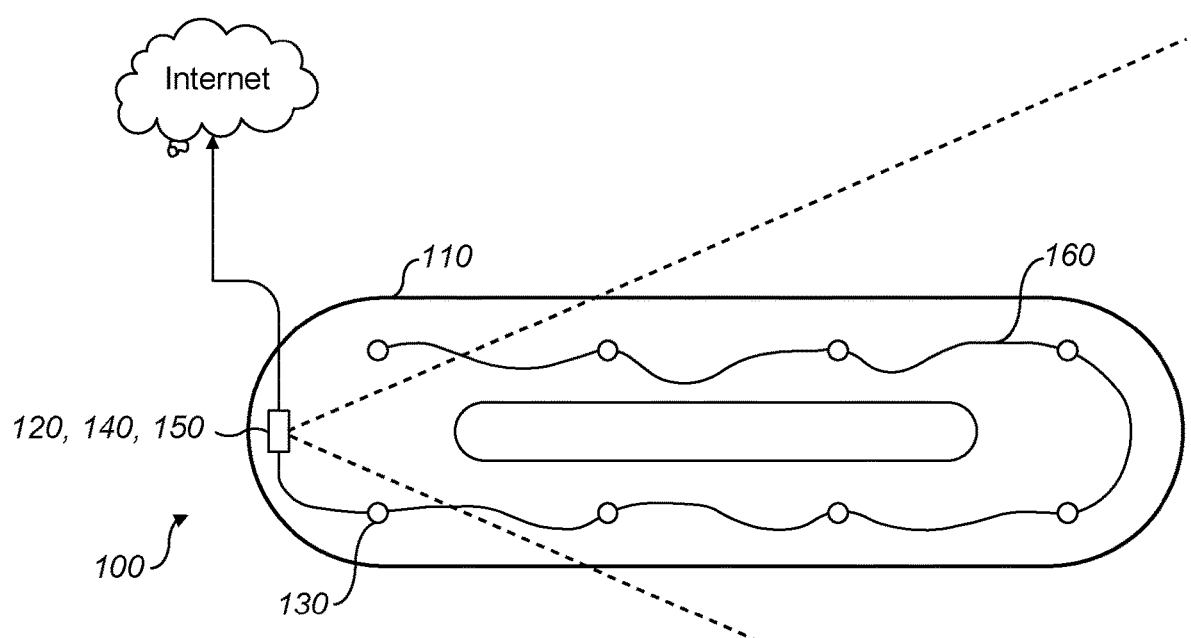
FIG. 1 is a schematic illustration of a system for determining occupancy according to one example embodiment.

FIG. 1 is a schematic illustration of a system 100 for determining occupancy of a meeting table 110 in an office meeting room. As shown, the system 100 comprises a motion detector in the form of a passive infrared detector (PIR) 120, a plurality of local presence detectors 130 and a common controller 140. Each local presence detector 130 is configured to detect the presence of an individual at one (and only one) place at the table 110. Each local presence detector may comprise a scanning sensor such as a thermal sensor. The PIR 120 is configured to detect the presence of an individual at any place at the table 110. It is therefore a common detector for all of the spaces in the multi-occupancy space.

The controller 140 is configured to receive signals from the PIR 120 and to monitor whether any individual is detected at any place at the table 110. If the presence of an individual is detected based on a signal derived from the PIR 120, the controller polls the local presence detectors to determine occupancy. At the same time the PIR may be powered down by the controller 140. The controller 140 may communicate with a remote server (e.g. by way of internet connection) and may send occupancy information to the remote server, for example for display.

After occupancy has been determined, polling of the local presence detectors 130 continues (e.g. periodically) until signals received from the local presence detectors 130 indicate that none of the places at the table 110 are occupied. At this time the controller 140 powers down the local presence detectors 130 and resumes monitoring of the general area of the meeting table using the PIR 120.

In the example of FIG. 1, the common controller 140 and the PIR 120 are integrated into a single unit 150. A daisy chain connection sensor bus 160 connects the individual presence sensors to the PIR detector and the controller. In this way, the detectors 120, 130 are hard-wired to the controller 140. Alternatively, the detectors 120, 130 and controller 140 could be connected wirelessly, but hard-wiring is advantageous because less power is needed compared to wireless techniques. The hard-wiring approach also ensures that the presence sensors can be polled at the same time so that a "snapshot" in time is captured by the common controller 140.

Although FIG. 1 shows a system for determining occupancy of a table, in other examples systems may be provided to determine occupancy of other multi-occupancy spaces such as a row of desks or a multi seat sofa. Advantageously, the multi-occupancy space is a contiguous space such as a table as this facilitates hard-wiring of the components of the system (for example wires may run under a table).

Figure 2:
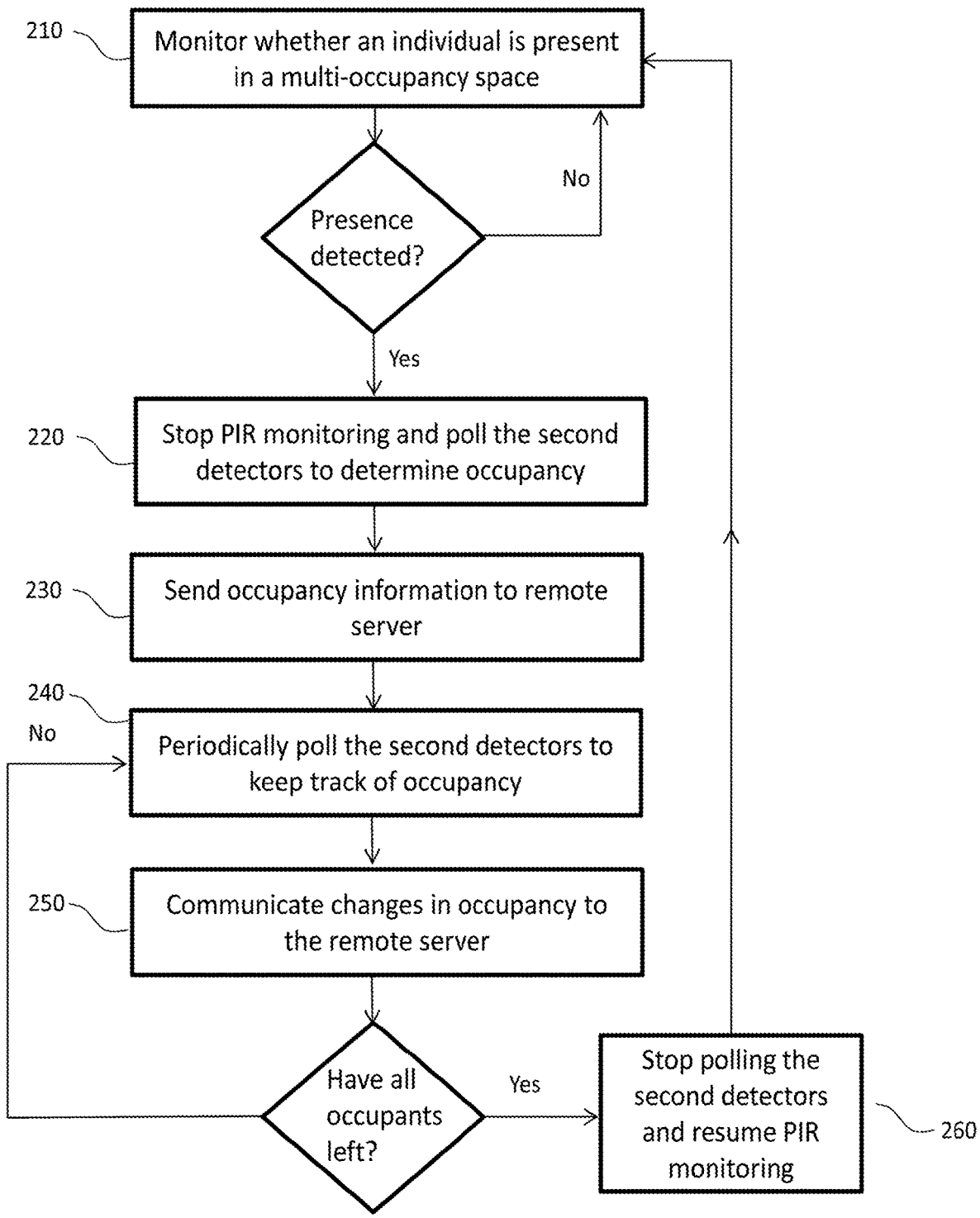
FIG. 2 is a flow chart showing various operations that may be carried out by a controller.

FIG. 2 is a flow chart illustrating various operations that may be carried out by the controller 140. In operation 210, the controller 140 monitors whether an individual is present in a multi-occupancy space, based on a signal derived from the first detector 120. In this state the first detector 120 is in an "awaiting trigger" mode, sensing for a movement. If the presence of one or more individuals is detected based on a signal derived from the first detector 120, then the controller 140 polls 220 the plurality of second detectors 130 and determines occupancy of the multi-occupancy space based on signals derived from the second sensors, for example by counting the number of detections by the second detectors. Hence in various embodiments the controller may determine occupancy information comprising aggregate and/or individual occupancy of the spaces in the multi-occupancy space. In operation 230, the controller 140 causes the occupancy information to be sent to a remote server, for example for display of the occupancy information. In operation 240, the controller 140 keeps track of the occupancy of the multi-occupancy space by periodically polling the second detectors. In operation 250, the controller causes any changes in occupancy to be communicated to the remote server.

If, at some time, the signals derived from the second detectors indicate than no individuals are present in said plurality of spaces (e.g. because all of the occupants have left), then the controller stops 260 periodic polling of the second detectors and resumes 290 monitoring of the multi-occupancy space using the first detector 120. The process then returns to operation 210.

Figure 3:
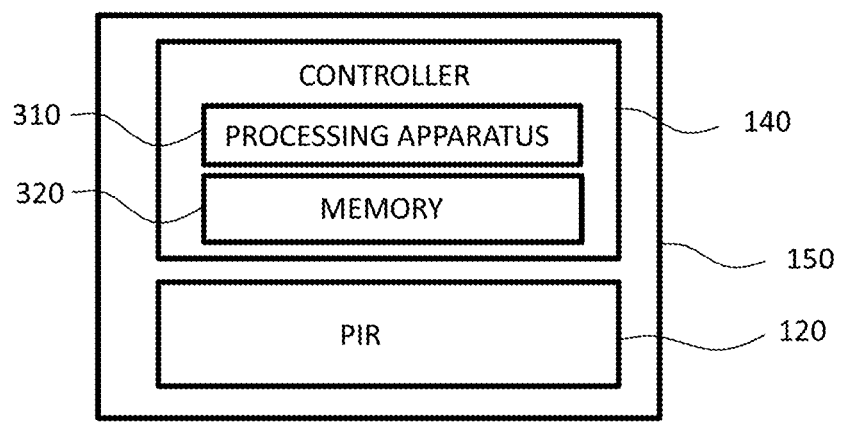
FIG. 3 shows a unit comprising a controller and first detector.

FIG. 3 shows the unit 150 in more detail. As shown the controller 140 comprises processing apparatus 310 communicatively coupled with memory 320. The memory has computer readable instructions stored thereon, which when executed by the processing apparatus causes the controller to cause performance of operations as described herein (e.g. operations as described above with reference to FIG. 2). The controller may in some instances be referred to, in general terms, as "apparatus".

The processing apparatus 310 may be of any suitable composition and may include one or more processors of any suitable type or suitable combination of types. For example, the processing apparatus may be a programmable processor that interprets computer program instructions and processes data. The processing apparatus may include plural programmable processors. Alternatively, the processing apparatus may be, for example, programmable hardware with embedded firmware. The processing apparatus may alternatively or additionally include one or more specialised circuit such as field programmable gate arrays FPGA, Application Specific Integrated Circuits (ASICs), signal processing devices etc.

The processing apparatus 310 is coupled to the memory 320 and is operable to read/write data to/from the memory 320. The memory 320 may comprise a single memory unit or a plurality of memory units, upon which the computer readable instructions (or code) is stored. For example, the memory may comprise both volatile memory and non-volatile memory. In such examples, the computer readable instructions/program code may be stored in the non-volatile memory and may be executed by the processing apparatus 310 using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

As will be seen from the foregoing, various aspects of the present specification provide apparatus and method of measuring utilisation of occupancy spaces, for example in work environments such as offices. Aspects of the specification take advantage of the fact that many contiguous spaces such as meeting rooms are only used occasionally. Systems and method according to embodiments detect individual presence only when needed, thereby reducing power budget and reducing data traffic.

Many modifications and variations are possible. For example, although systems having a single common detector are described above, alternatively a system may comprise more than one first detector, e.g. more than one PIR. Moreover, instead of a PIR, a temperature or humidity sensor, a noise sensor (such as a microphone), a light sensor, or any other suitable detector could be employed as a first detector. Still further although the controller is described above as being included in a unit together with the PIR, alternatively the controller could be included in a unit together with one of the second detectors, or in a separate unit or in a remote server.

Many further modifications and variations will be evident to those skilled in the art, that fall within the scope of the following claims:

1. A system, comprising:
  a first detector for detecting whether a multi-occupancy space is occupied by an individual;
  a plurality of second detectors for detecting whether at least one individual is present in each of a respective plurality of spaces within the multi-occupancy space; and
  a controller configured to:
    monitor whether at least one individual is present in the multi-occupancy space, based on a signal derived from the first detector; and
    if the presence of at least one individual is detected based on the signal derived from the first detector, to determine occupancy of the multi-occupancy space based on signals derived from the plurality of second detectors, and stop said monitoring by the first detector if the presence of at least one individual is detected in the multi-occupancy space.

2. The system of claim 1, wherein the first detector is a different type of detector to each of the second detectors.

3. The system of claim 1, wherein the second detectors comprise scanning detectors.

4. The system of claim 1, wherein the first detector comprises a passive infrared sensor.

5. The system of claim 1, wherein the plurality of second detectors are connected to the controller by a daisy chain connection sensor bus.

6. The system of claim 1, wherein the first detector and the controller are integrated in a single unit.

7. The system of claim 1, wherein the second detectors are battery operated.

8. The system of claim 1, wherein the controller is configured to transmit data relating to the occupancy of the multi-occupancy space to a remote server.

9. A method, comprising:
  monitoring whether one or more individuals is present in a multi-occupancy space, based on a signal derived from a first detector;
  if the presence of one or more individuals is detected based on the signal derived from the first detector, then:
    determining occupancy of the multi-occupancy space based on signals derived from a plurality of second detectors, said second detectors being configured for detecting a presence of one or more individuals in each of a respective plurality of spaces within the multi-occupancy space, and
    stopping said monitoring if the presence of one or more individuals is detected in the multi-occupancy space.

10. A method according to claim 9, wherein stopping said monitoring comprises causing the first detector to power down.

11. The method of claim 9, further comprising:
  monitoring whether the one or more individuals is present in each of said plurality of respective spaces within the multi-occupancy space, based on signals derived from the second detectors;
  if the signals derived from the second detectors indicate that no individuals are present in said plurality of spaces, then:
    stopping said monitoring based on signals derived from the second detectors.

12. The method of claim 11, wherein if the signals derived from the second detectors indicate that no individuals are present in said plurality of spaces, then:
  causing the first detector to resume monitoring whether one or more individuals are present in the multi-occupancy space.

13. The method of claim 11, wherein stopping said monitoring based on signals derived from the second detectors comprises causing the second detectors to power down.

14. The method of claim 9, wherein determining occupancy of the multi-occupancy space comprises polling the plurality of second detectors.

15. The method of claim 9, further comprising periodically polling the plurality of second detectors to keep track of the occupancy of the multi-occupancy space.

16. The method of claim 9, wherein determining occupancy of the multi-occupancy space based on signals derived from the second detectors comprises counting the number of occupied spaces detected by the second detectors.

17. Apparatus configured to perform the method of claim 9.

* * * * *